United States Patent [19]
Erdman et al.

[11] Patent Number: 5,847,524
[45] Date of Patent: Dec. 8, 1998

[54] CONSTANT SPEED CONTROL FOR A MOTOR

[75] Inventors: David M. Erdman; James R. Kiefer; Robert K. Hollenbeck, all of Fort Wayne, Ind.

[73] Assignee: General Electric Company, Fort Wayne, Ind.

[21] Appl. No.: 821,247

[22] Filed: Mar. 20, 1997

Related U.S. Application Data

[63] Continuation-in-part of Ser. No. 761,748, Dec. 5, 1996.
[51] Int. Cl.$^6$ .................................................. A01R 39/46
[52] U.S. Cl. .......................... 318/439; 318/254; 318/138;
318/798-815; 318/632; 318/638; 318/601;
318/607; 318/432; 388/813
[58] Field of Search .................................... 318/254, 138,
318/439, 798–815, 632, 638, 601, 607,
432; 388/813

[56] References Cited

U.S. PATENT DOCUMENTS

| | | | |
|---|---|---|---|
| 3,180,267 | 4/1965 | Bemmann et al. | 310/68 R |
| 3,248,626 | 4/1966 | Landis | 388/837 X |
| 3,333,172 | 7/1967 | Brailsford | 318/138 |
| 3,375,422 | 3/1968 | Boudigues | 318/138 |
| 3,569,806 | 3/1971 | Brailsford | 318/254 |
| 3,740,629 | 6/1973 | Kohlhagen | 318/138 |
| 3,759,051 | 9/1973 | Ohnishi | 62/180 |

(List continued on next page.)

FOREIGN PATENT DOCUMENTS

| | | | |
|---|---|---|---|
| 0458211 | 11/1991 | European Pat. Off. . | |
| 94301168 | 2/1994 | European Pat. Off. | H02P 6/02 |
| 0688091 | 5/1995 | European Pat. Off. . | |
| 60-121988 | 6/1985 | Japan . | |
| 61-218391 | 9/1986 | Japan . | |
| 63-071975 | 3/1988 | Japan | H02P 6/02 |
| 05044376 | 2/1993 | Japan | H02P 6/02 |

OTHER PUBLICATIONS

J.S. Mayer et al., 8047d IEEE Transactions on Energy, Conversion 4(1989) Sep., No. 3, New York, U.S.
Analysis and Modeling of a Single–Phase Brushless DC Motor Drive System, Sep. 1989, pp. 473–479.

*Primary Examiner*—Karen Masih
*Attorney, Agent, or Firm*—Wayne O. Traynham

[57] ABSTRACT

A motor having a power switching circuit adapted to be connected between a power source and its winding for selectively energizing the winding to generate a magnetic field which causes a rotating assembly to rotate. A position sensing circuit provides a position signal representative of the position of the rotating assembly and a commutating circuit controls the power switching circuit to commutate the power switching circuit at a commutating angle to achieve a desired rotating speed of the rotating assembly. The commutating circuit varies the commutating angle in response to the position signal to maintain the substantially constant rotating speed of the rotating assembly. As result, the efficiency of the motor is varied to maintain the substantially constant rotating speed.

18 Claims, 7 Drawing Sheets

U.S. PATENT DOCUMENTS

| | | | |
|---|---|---|---|
| 3,805,134 | 4/1974 | Osamu et al. | 318/254 |
| 3,831,071 | 8/1974 | Mitsui | 318/254 |
| 4,022,980 | 5/1977 | Kitzjewski et al. | 179/18 HB |
| 4,099,104 | 7/1978 | Muller | 318/138 |
| 4,134,035 | 1/1979 | Donahoo | 310/42 |
| 4,152,613 | 5/1979 | Kitai et al. | 310/68 R |
| 4,162,418 | 7/1979 | Kawaki et al. | 310/49 |
| 4,230,976 | 10/1980 | Muller | 318/138 |
| 4,249,116 | 2/1981 | Hieda | 318/254 |
| 4,259,603 | 3/1981 | Uchiyama et al. | 310/68 B |
| 4,262,241 | 4/1981 | Azusawa | 318/703 X |
| 4,347,464 | 8/1982 | Park et al. | 318/254 |
| 4,365,187 | 12/1982 | McDaniel et al. | 318/254 |
| 4,376,261 | 3/1983 | vonderHeide et al. | 318/254 |
| 4,379,984 | 4/1983 | Muller | 318/254 |
| 4,408,150 | 10/1983 | Holston et al. | 318/779 |
| 4,449,081 | 5/1984 | Doemen | 318/254 |
| 4,486,697 | 12/1984 | Diefenbach et al. | 318/703 |
| 4,491,772 | 1/1985 | Bitting | 318/254 |
| 4,511,827 | 4/1985 | Morinaga et al. | 318/254 |
| 4,512,724 | 4/1985 | Horvath | 310/89 |
| 4,520,296 | 5/1985 | Lepper et al. | 318/254 |
| 4,544,868 | 10/1985 | Murty | 318/254 |
| 4,565,956 | 1/1986 | Zimmermann et al. | 318/721 |
| 4,574,225 | 3/1986 | Pershall et al. | 318/254 |
| 4,600,864 | 7/1986 | Sato | 318/254 |
| 4,618,806 | 10/1986 | Grouse | 318/254 |
| 4,638,223 | 1/1987 | Tajima et al. | 318/254 |
| 4,642,534 | 2/1987 | Mitchell | 318/138 |
| 4,651,069 | 3/1987 | Pellegrini | 318/254 |
| 4,686,437 | 8/1987 | Langley et al. | 318/254 |
| 4,712,054 | 12/1987 | Boldt | 318/809 X |
| 4,717,864 | 1/1988 | Fultz | 318/254 |
| 4,724,365 | 2/1988 | Muller | 318/254 |
| 4,734,627 | 3/1988 | Koerner | 318/254 |
| 4,737,674 | 4/1988 | Miyao | 310/268 |
| 4,742,259 | 5/1988 | Schaefer et al. | 310/156 |
| 4,743,815 | 5/1988 | Gee et al. | 318/254 |
| 4,748,388 | 5/1988 | Muller | 318/254 |
| 4,760,315 | 7/1988 | Nanae et al. | 318/254 |
| 4,763,052 | 8/1988 | Lundin et al. | 318/254 |
| 4,777,419 | 10/1988 | Obradovic | 318/696 |
| 4,782,272 | 11/1988 | Buckley et al. | 318/254 |
| 4,855,629 | 8/1989 | Sato | 310/49 |
| 4,891,567 | 1/1990 | Fujitani et al. | 318/254 |
| 4,928,043 | 5/1990 | Plunkett | 318/254 |
| 4,929,871 | 5/1990 | Gerfast | 315/205 |
| 4,950,960 | 8/1990 | Krefta et al. | 318/254 |
| 4,958,099 | 9/1990 | Chigira et al. | 310/71 |
| 4,987,329 | 1/1991 | Schmidt et al. | 310/156 |
| 4,987,331 | 1/1991 | Horng | 310/254 |
| 5,040,286 | 8/1991 | Stark | 29/598 |
| 5,045,740 | 9/1991 | Hishinuma | 310/156 |
| 5,093,599 | 3/1992 | Horng | 310/254 |
| 5,114,171 | 5/1992 | D'Antonio | 280/612 |
| 5,126,608 | 6/1992 | Sogabe et al. | 310/71 |
| 5,130,591 | 7/1992 | Sato | 310/172 |
| 5,162,709 | 11/1992 | Ohi | 318/254 |
| 5,179,308 | 1/1993 | Malsky | 310/90.5 |
| 5,194,794 | 3/1993 | Shamoto | 318/138 X |
| 5,196,775 | 3/1993 | Harris et al. | 318/638 |
| 5,293,103 | 3/1994 | Hanna | 318/268 |
| 5,304,904 | 4/1994 | Sakai | 318/484 |
| 5,446,326 | 8/1995 | Scheider | 310/68 R |
| 5,492,458 | 2/1996 | Horng | 417/423.7 |
| 5,521,481 | 5/1996 | Yamada | 368/813 X |

FIG-1

FIG_2

FIG_3A

FIG_3B

FIG_6A

FIG_6B

FIG_6C

FIG_7A

FIG_7B

FIG_7C

FIG_8A

FIG_8B

CONSTANT SPEED CONTROL FOR A MOTOR

CROSS REFERENCE TO RELATED APPLICATIONS

This application is a continuation in part of U.S. patent application Ser. No. 08/761,748 filed Dec. 5, 1996, the entire disclosure of which in incorporated herein by reference.

BACKGROUND OF THE INVENTION

1. Field of the Invention

The invention generally relates to motors and, in particular a speed control for a single phase motor which maintains the motor speed at a preselected value, although the invention is also applicable to multiphase motors.

2. Description of the Prior Art

In order to keep manufacturing costs of low cost motors to a minimum, the control circuits for these low output type of motors use low cost components such as application specific integrated circuits (ASIC) or other circuits to set the speed of the motor at a given voltage and frequency.

One disadvantage to using an ASIC for setting the speed of to the motor at a certain level is that the motor speed will vary depending on environmental conditions and, in particular, depending on the resistance to rotation which the motor encounters. There is a need for a low output, low cost motor which operates at a constant or near constant speed.

SUMMARY OF THE INVENTION

It is an object of this invention to provide a low cost, low output motor which operates at a constant speed although its efficiency may vary.

It is another object of this invention to provide a motor which maintains a constant speed by retarding the commutation angle when the motor speed is greater than the desired speed.

It is another object of this invention to provide a low output, low cost motor which operates at a selectable, substantially constant speed.

It is another object of this invention to provide a motor which is low in cost and which may be employed as an evaporator fan motor for refrigeration.

Generally, a motor and control for use with a substantially constant power source embodying aspects of the invention includes a rotating assembly and a stationary assembly in magnetic coupling relation to the rotating assembly. The stationary assembly includes a winding. The control includes a power switching circuit for selectively connecting the power source to the winding during a commutation period. The control also includes power switches for receiving gate drive signals for selectively energizing the winding to generate a magnetic field which causes the rotating assembly to rotate relative to the stationary assembly. A circuit generates a speed signal representative of a rotational speed of the rotatable assembly relative to the stationary assembly. A commutating circuit responds to the speed signal and includes a generating circuit for generating commutation signals corresponding to the speed signal for controlling the power switches. The commutating circuit provides the gate drive signals for commutating the power switches at a commutating angle for a commutation period. The commutating circuit determines a difference between a reference representing a desired rotational speed of the rotating assembly and a repetition rate of the commutation signals, which repetition rate corresponds to an actual rotational speed of the rotating assembly. The commutating circuit retards the commutating angle and/or decreases a length of the commutation period when the determined difference indicates that the actual speed of the rotating assembly is greater than the desired rotating speed to maintain a substantially constant rotating speed of the rotating assembly whereby the efficiency of the motor is varied to maintain the substantially constant rotating speed.

Another embodiment of the invention is directed to a motor for use with a substantially constant power source. A stationary assembly in magnetic coupling relation to a rotating assembly includes a winding. A power switching circuit includes power switches adapted to selectively connect the power source to the winding during a commutation period. The power switches receive the gate drive signals for selectively energizing the winding to generate a magnetic field which causes the rotating assembly to rotate relative to the stationary assembly. A circuit generates a speed signal representative of a rotational speed of the rotatable assembly relative to the stationary assembly. A commutating circuit includes a generating circuit responsive to the speed signal for generating commutation signals corresponding to the speed signal. The commutation signals control the power switches. The commutating circuit also includes a comparing circuit for determining a difference between a reference representing a desired rotational speed of the rotating assembly and a repetition rate of the commutation signals, which repetition rate corresponds to an actual rotational speed of the rotating assembly. The commutating circuit also includes a delay circuit for providing the gate drive signals to the power switches. The delay circuit delays the switching of the power devices relative to the commutation signals when the determined difference indicates that the actual rotational speed of the rotating assembly is greater than the desired rotational speed to maintain a substantially constant rotating speed of the rotating assembly whereby the efficiency of the motor is varied to maintain the substantially constant rotating speed.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
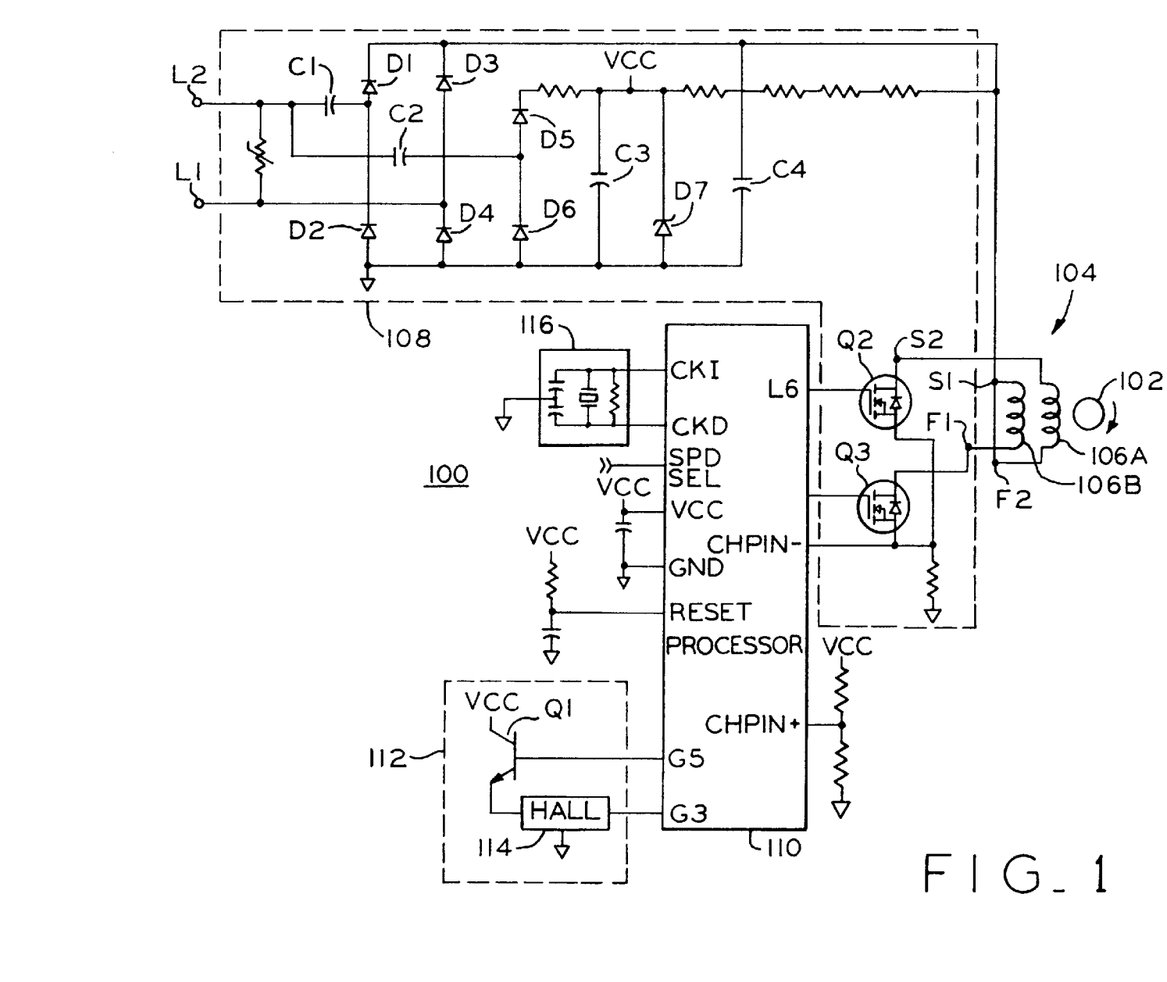
FIG. 1 is a schematic diagram one preferred embodiment of constant speed control circuit and motor according to the invention.

Referring to FIG. 1, a schematic diagram of one preferred embodiment of a constant speed control circuit and motor 100 according to the invention is illustrated. The motor is for use with an alternating current power source (not shown) which would be connected to input terminals L1 and L2. The motor includes a rotating assembly 102 such as a permanent magnet rotor which is received within a stationary assembly 104 in magnetic coupling relation to the rotating assembly 102 and including a winding 106. As illustrated in FIG. 1, the motor may be a single phase motor in which case the winding may be comprised of two bifilar or layered windings 106A and 106B, each of which energized for approximately one half of the rotation of the rotating assembly 102 to apply a magnetic field to the rotating assembly to cause it to rotate. As an example and not by way of limitation, the rotating assembly 102 and the stationary assembly 104 may be a MOTOR WITH EXTERNAL ROTOR AND METHOD FOR ASSEMBLY as described in co-assigned, co-pending U.S. patent application Ser. No. 08/761,728, filed Dec. 5, 1996, the entire disclosure of which is incorporated herein by reference.

The motor 100 also includes a power switching circuit 108 adapted to be connected to the power source via terminals L1 and L2 and connected to the windings at terminations S1, S2, F1, F2 for selectively energizing the winding 106 to generate a magnetic field which causes the rotating assembly 102 to rotate. In particular, the power switching circuit 108 includes a capacitive circuit for driving the winding 106. In particular, power capacitor C1 in series with the power supply determines the amount of power which is applied to the windings. Capacitor C1 is connected to a diode bridge D1–D4 which rectifies the alternating current applied to the terminals L1, L2. Filter capacitor C4 smooths the rectified dc voltage to be applied to the windings 106.

The power switching circuit 108 also includes two FET power switches Q2, Q3 for selectively connecting the windings 106A, 106B to the ground thereby completing the circuit for applying the rectified dc to the windings.

The motor 100 also includes a commutating circuit, such as a microprocessor 110 for controlling the FET power switches Q2, Q3 to commutate the power switching so that the winding 106 is energized at a commutating angle. The microprocessor controls the FET switches Q2, Q3 to apply power to the windings 106 at a substantially constant duty cycle to achieve a desired rotating speed of the rotating assembly 102. The microprocessor 110 uses an oscillator 116 as a time reference and varies the commutating angle in response to a position signal provided by a position sensing circuit 112. The position signal is representative of the position of the rotating assembly 102. As a result, the microprocessor 110 maintains a substantially constant rotating speed of the rotating assembly 102. By varying the commutating angle, the power input into the motor remains substantially constant while the motor output is effectively reduced so that the efficiency of the motor is varied to maintain the substantially constant rotating speed.

Preferably, the position sensing circuit 112 includes a hall device 114 or other position sensing device or circuit positioned in proximity to the rotating assembly 102 to provide a position signal representative of the position of the rotating assembly 102. Preferably, the hall device 114 is positioned to indicate a signal when a back emf of the winding 106 becomes positive. Preferably, hall device 114 is intermittently operated by the microprocessor 110 by pulse width modulating of a switch Q1 in order to reduce the power needed to operate the hall device. When the hall device is properly positioned to indicate when a back emf of the winding 106 becomes positive, the processor 110 controls the power switches Q2, Q3 to energize the winding 106 for a preset period beginning when the position signal generated by the hall device 114 indicates that the back emf becomes positive. It is also contemplated that a back emf position sensing circuit may be used in addition to or in place of the hall device 114.

Power capacitor C1 forms a capacitive circuit for driving the windings 106. The microprocessor 110 of the commutating circuit advances a commutating angle when the position signal provided by the position sensing circuit 112 indicates that the speed of the rotating assembly 102 is less than the desired rotating speed. Alternatively, the microprocessor 110 retards the commutating angle when the position signal indicates that the speed of the rotating assembly 102 is greater than the desired rotating speed. It is contemplated that the microprocessor 110 may have an input SPD SEL for selecting the speed at which the motor will operate, for varying the speed according to an input signal or for selecting between a preset number of speeds. As illustrated in FIG. 1, the processor 110 includes an input G3 for receiving the position signal generated by the hall device 114 and has outputs L5, L6 for controlling the FET switches Q2, Q3. As indicated above, the commutating circuit 108 energizes each part of the windings 106A, 106B at a substantially constant duty cycle which means that each part of the winding is energized for a preset period of time of approximately 75% of the period of time during which the back emf is positive.

Figure 2:
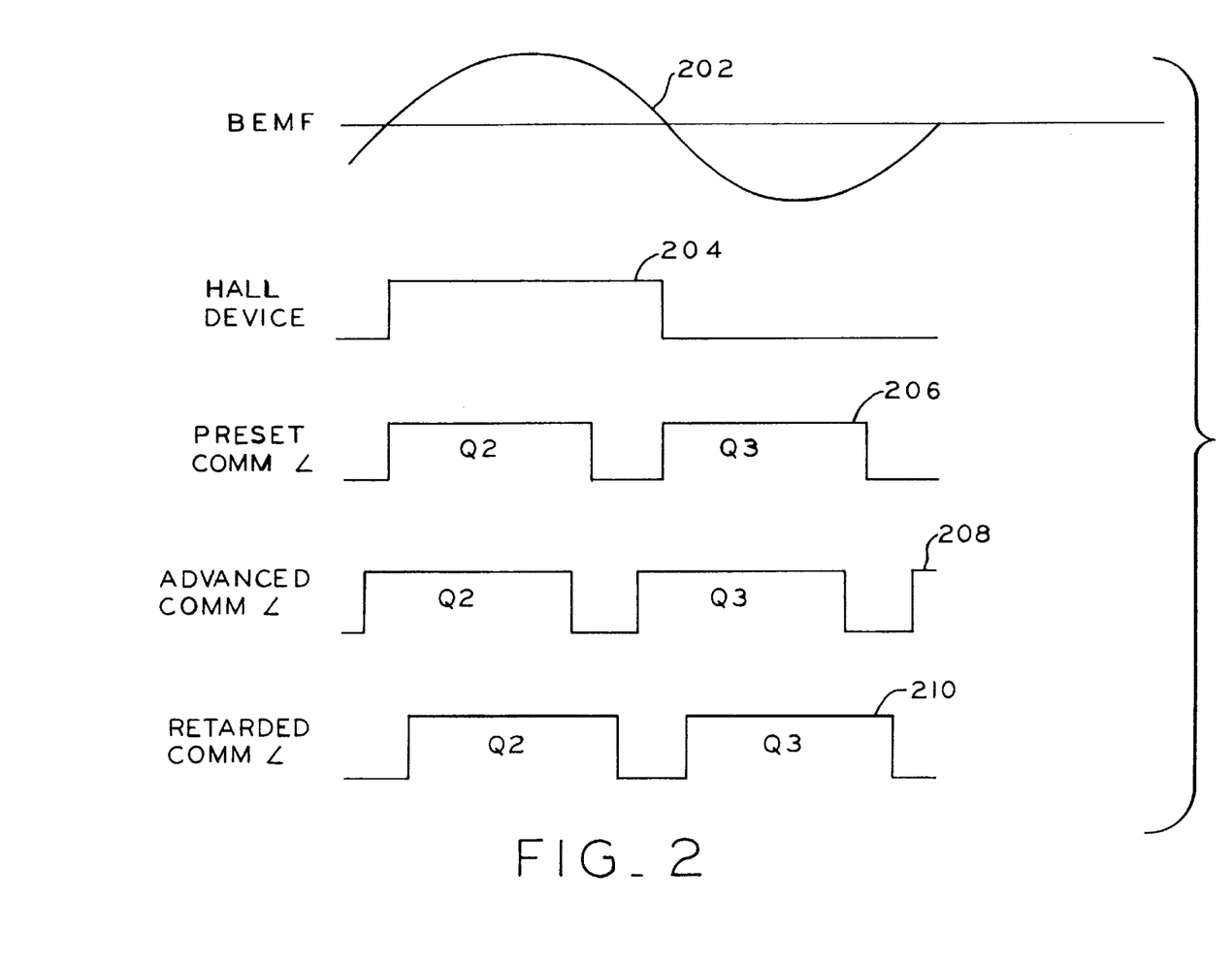
FIG. 2 is a timing diagram of the waveforms of the motor of FIG. 1 according to the invention.

Referring to FIG. 2, a timing diagram of the waveforms of the motor 100 according to the invention is illustrated. Waveform 202 illustrates the back emf induced in the winding 106 by the rotation of rotating assembly 102. Waveform 202 is illustrated with a somewhat flat top. However, the actual shape of the back emf waveform will depend on the skewing of the permanent magnets of the rotating assembly 102 and also may depend on the shape of the stator teeth. Preferably, the hall device 114 is positioned to provide a signal 204 which corresponds to the period of time that the back emf waveform 202 is positive. Although the hall device position signal 204 is shown as a single, continuous pulse during the period that the back emf is positive, it is contemplated that the hall device may be pulsed width modulated by switch Q1 so that, in fact, pulse 204 would be a series of pulses depending on the duty cycle (pulse width) of the modulation by switch Q1. For convenience, the hall device waveform 204 is illustrated as a single pulse 204. Preferably, the hall device is positioned on the stator 104 at the commutation point so that it is affected by the magnetic flux between the teeth of the stator 104.

Normally, the motor would be configured to energize the winding for a period of time beginning when the back emf turns positive so that a desired operating speed would be achieved at a preset commutation angle arbitrarily defined as 0°. Waveform 206 illustrates this aspect in which FET switch Q2 is closed for 75% of the period of time that the back emf is positive in order to energize winding 106A. Similarly, FET switch Q3 is closed for 75% of the time that the back emf is negative to energize winding 106B. Although the energization of the windings may be pulse width modulated, it is contemplated that the windings would be continuously energized to reduce audible noise. Generally, commutating the windings beginning with the zero crossing of the back emf would provide the most efficient operation of the motor.

In the event that the mechanical load being driven by the rotating assembly 102 is reduced, the motor speed would normally increase because the same amount of power is being applied via capacitor C1. For example, rotating assembly 102 may drive an evaporator fan of a refrigerator. If the resistance to airflow is somewhat diminished, an increase in the speed of the motor would result. In order to maintain the motor at constant speed to in order to accomplish constant airflow, the microprocessor 110 would be programmed to retard the commutation angle of the windings as illustrated by waveform 210. Since the duty cycle remains substantially constant, the turn on and turn off times are both retarded by about the same amount of time. The extent to which the commutation angle may he retarded to slow down the motor depends on the magnetic and electrical characteristics of the motor. At some point, a retarded angle will reach a point of diminishing returns. In general, the current flow into the motor depends on the inductance of the motor so that low inductance motors will not respond as significantly as high inductance motors to an advance in the state timing.

In the event that the mechanical load being driven by the rotating assembly 102 is increased, the motor speed would normally decrease because the same amount of power is being applied via capacitor C1. For example, rotating assembly 102 may drive an evaporator fan of a refrigerator. If the resistance to airflow is somewhat increased, an decrease in the speed of the motor would result. In order to maintain the motor at constant speed, the commutation angle of the windings would be advanced as illustrated by waveform 208. Since the duty cycle remains substantially constant, the turn on and turn off time are both advanced by about the same amount of time. The extent to which the commutation angle may be advanced to speed up the motor depends on the magnetic and electrical characteristics of the motor. At some point, an advanced angle will reach a point of diminishing returns. In general, the current flow into the motor depends on the inductance of the motor so that low inductance motors will not respond as significantly as high inductance motors to an advance in the state timing.

Diodes D5 and D6, filter capacitor C3, Zener diode D7 and current source capacitor C2 generate an VCC voltage for driving the microprocessor 110.

Since capacitor C1 limits the power applied to the windings, it avoids the need for a thermal fuse in series with capacitor C4 for safety considerations. As a minimum, a 50% duty cycle is needed to rotate the rotor 102 whereas the maximum duty cycle is 100% during the period that the back emf is positive. A 75% duty cycle tends to be the most efficient. The 75% duty cycle is generally set at the most efficient point for a low power supply line voltage at maximum load. In general, varying the duty cycle of the voltage applied to the windings does not significantly effect the speed of the motor although it does significantly effect the efficiency of the motor. This is because varying the duty cycle tends to create other factors, such as interaction with the inductance of the motor, which will not be significantly effected. Once again, the power capacitor C1 provides a constant power so that the duty cycle alone does not determine the speed of the motor. Immediately before the zero crossing of the back emf, the inductance of the motor tends to be higher which is part of the compensating aspects involved.

Figure 3A:
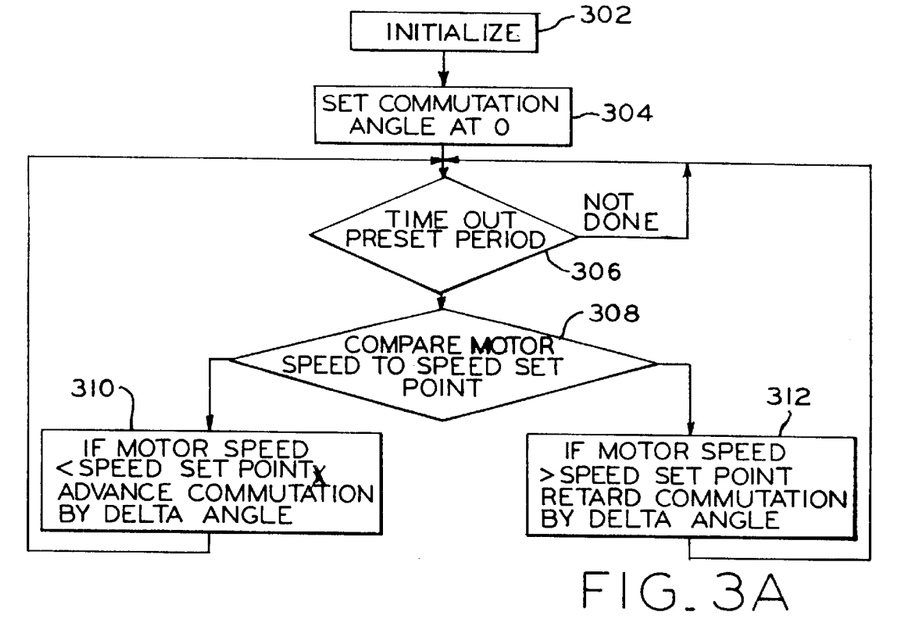
FIG. 3A is a flow chart of one preferred embodiment of software for operating the microprocessor of the control circuit of FIG. 1 in which a time delay is used to allow for stable motor operation.
Figure 3B:
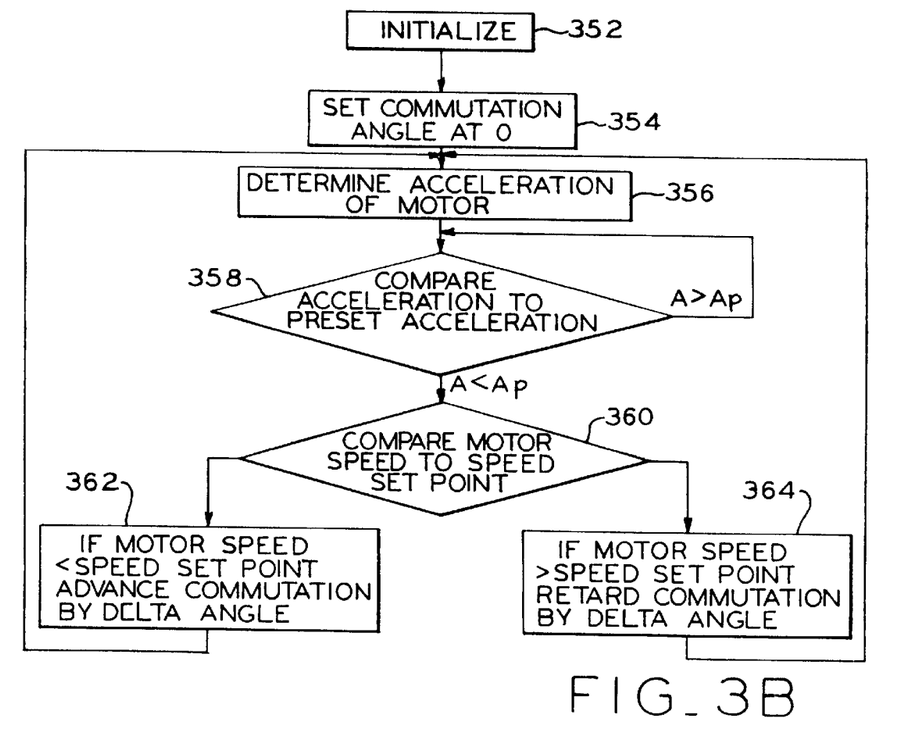
FIG. 3B is a flow chart of one preferred embodiment of software for operating the microprocessor of the control circuit of FIG. 1 in which acceleration monitoring is used to allow for stable motor operation.

FIGS. 3A and 3B are flow charts of preferred software embodiments for operating the microprocessor 110. Both flow charts are configured to advance the commutation angle by a delta angle if the motor speed is less than the speed set point or to retard the commutation angle by a delta angle if the motor speed is greater than the speed set point. The difference between the two flow charts is the technique which is used to determine motor stability. In FIG. 3A, a preset period is timed out in order to allow the motor to stabilize whereas FIG. 3B monitors motor acceleration to determine its stable operation.

Referring to FIG. 3A, after initializing at step 302, the commutation angle is set at zero by step 304. Step 306 times out a preset period to allow the motor to approach its operating speed. This preset period would preferably be approximately 2–5 seconds. After this preset period has been timed out, step 308 compares the actual motor speed to a speed set point. In general, the speed set point may be in the range of 1,400–1,800 RPMs, although any set point would be appropriate depending on the size and application of the motor. If the motor speed is less than the speed set point, step 310 advances the commutation by a delta angle. This delta angle will be approximately 8°. If the motor speed is greater than the speed set point, step 312 retards the commutation angle by the delta angle. The delta angle for retardation may be different than the delta angle for advancement. Microprocessor 110 returns to step 306 to continue its operation.

Similarly, in FIG. 3B, the microprocessor 110 is initialized by step 352 and the commutation angle is set to zero at step 354. At step 356, the microprocessor 110 determines the acceleration of the motor according to the position signal. This acceleration is compared to a preset acceleration such as 2 RPMs per second. If the motor acceleration is greater than the preset acceleration, the software holds at step 358. When the motor acceleration is less than the preset acceleration, suggesting that the acceleration is decreasing and the motor is beginning to stabilize, the microprocessor 110 proceeds to step 360 to compare the motor speed to the speed set point. If the motor speed is less than the speed set point, the commutation angle is advanced by a delta angle by step 362. Otherwise, if the motor speed is greater than the speed set point, the commutation angle is retarded by a delta angle by step 364. Microprocessor 110 returns to step 356 to continue its operation.

Referring to FIGS. 4–8, other preferred embodiments of a motor for use with a power source are illustrated. These embodiments include motors in the 5–16 watt range for driving small fans such as evaporator fans used in refrigerators or freezers. In these embodiments, a speed signal such as a signal derived from a position sensing circuit is used to represent the actual motor speed. This signal or its derivative is compared to reference representing the desired speed. If the actual motor speed is greater than the desired speed, the ON time of the power devices supplying power to the motor winding or windings is delayed and decreased (such as by delaying the commutation angle start point) to reduce motor efficiency and bring the actual motor speed down until it corresponds to the desired motor speed. Conversely, if the actual motor speed is less than the desired speed, the ON time of the power devices supplying power to the motor winding or windings is increased (such as by advancing the commutation angle start point) to increase motor efficiency and bring the actual motor speed up until it corresponds to the desired motor speed.

Figure 4:
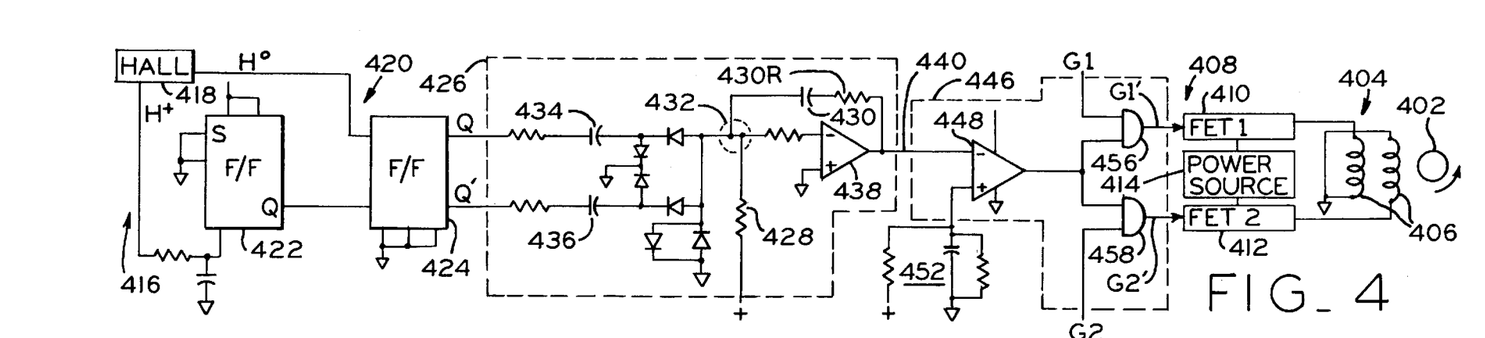
FIG. 4 is a schematic diagram of one preferred embodiment of a constant speed control circuit and motor according to the invention employing a Hall device providing a speed signal representing the motor speed, which speed signal is provided to a flip-flop circuit, a comparing circuit and a delay circuit which maintain constant speed by varying the delay of the commutation start point, i.e., the commutation angle.

As shown in FIG. 4, a rotating assembly 402 is in magnetic coupling relation to a stationary assembly 404 which includes a winding 406 having first and second winding portions. As shown in FIG. 4, the winding 406 is a center tap single phase winding, but it may be any single phase or multiple phase winding. A power switching circuit 408 includes power switches 410, 412 such as field effect transistors (FET) adapted to selectively connect power source 414 to each portion of the windings 406, respectively. The power switches receive gate drive signals G1', G2' for selectively energizing the winding to generate a magnetic field which causes the rotating assembly to rotate relative to the stationary assembly.

A circuit 416 generates a speed signal (H$^+$,H$^\circ$) representative of a rotational speed of the rotatable assembly relative to the stationary assembly. As shown in FIG. 4, the circuit 416 includes a hall sensor 418 for sensing magnets of the permanent magnet rotor 402. The circuit may be any circuit which provides a speed signal such as a back EMF sensing circuit, a rotor position sensing circuit, or other circuit which provides a signal indicative rotor speed or rotor position.

The remaining portion of FIG. 4 illustrates a commutating circuit which includes the following. The commutating circuit includes a generating circuit 420 responsive to the speed signals (H$^+$,H$^\circ$) for generating commutation signals Q, Q' corresponding to the speed signals. The commutation signals are used to control the power switches as will be pointed out below. As shown in FIG. 4, the generating circuit 420 includes two set/reset flip-flops 422, 424 for converting the outputs of the Hall sensor 418 into commutation signals Q, Q' which are high during the period of time that power switches 410, 412 should be closed respectively and would supply power to the winding 406.

Preferably, the hall device 418 is positioned to provide the position signal to indicate when the back emf of the winding changes polarity. In this case, the commutating circuit controls the power switches to energize the winding for a preset period of about 135 electrical degrees beginning when the position signal indicates that the back emf changes polarity.

The commutating circuit also includes a comparing circuit 426 for determining a difference between a reference representing a desired rotational speed of the rotating assembly 402 and a repetition rate of the commutation signals Q, Q', which repetition rate corresponds to an actual rotational speed of the rotating assembly. In this comparing circuit 426, the reference is a speed set resistor 428 which discharges a capacitor 430 through a summing junction 432 and supplies current into the junction. This reference is compared to current draw by two capacitors 434 and 436 in response to commutation. With each commutation, one of the commutation signals Q or Q' is high and the other is low. When signal Q is low, it discharges its capacitor 434 by drawing current from the summing junction 432. When signal Q' is low, it discharges its capacitor 436 by drawing current from the summing junction 432. Therefore, the amount of current drawn from the summing junction by capacitors 434 and 436 represents the actual speed of the motor. In addition, the amount of current supplied to the summing junction by discharging of a feedback capacitor 430 through speed set resistor 428 represents the desired speed of the motor. When the currents to or from the summary junction 432 are equal, a steady state condition results which is an indication that the actual motor speed equals the desired speed. Smaller resistance values of the speed set resistor 428 result in more current flowing into the summing junction 432 meaning a higher speed is desired and the capacitors 434 and 436 have to discharge more frequently before an unstable waveform indicating an overspeed condition is generated.

Figure 8A:
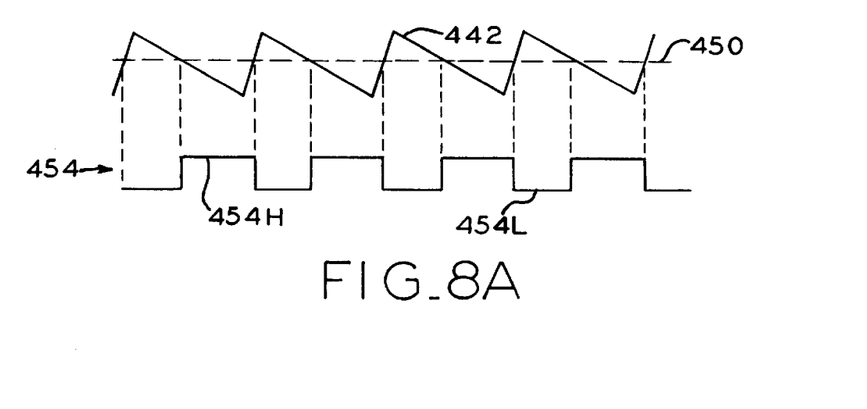
FIGS. 8A and 8B are timing diagrams of the waveforms of the motor of FIGS. 4–7C according to the invention.

The summing junction 432 is connected to a difference input of a differential operational amplifier 438 which has its sum input grounded so that its output is high. As long as the net current at the summing junction 432 is zero (i.e., steady state) or negative (meaning the actual speed is less than the desired speed), the waveform on line 440 is a stable sawtooth waveform 442 as shown in FIG. 8A. The sawtooth configuration is caused by the discharging of feedback capacitor 430. As the speed set resistor 428 provides current to the summing junction, the op amp 438 slowly reduces its output voltage to counterbalance current flow through the speed set resistor. As will be described below, a stable sawtooth waveform 442 represents no difference between the actual and desired speed.

An optional feedback resistor 430R may be placed in series with the feedback capacitor 430 to protect the op amp 438 from spikes. The remaining components of the comparing circuit 426, e.g. the diodes, permit the circuit to behave more predictably but do not affect currents into or out of the summing junction 432 and, thus, do not affect the speed control of the motor.

Figure 8B:
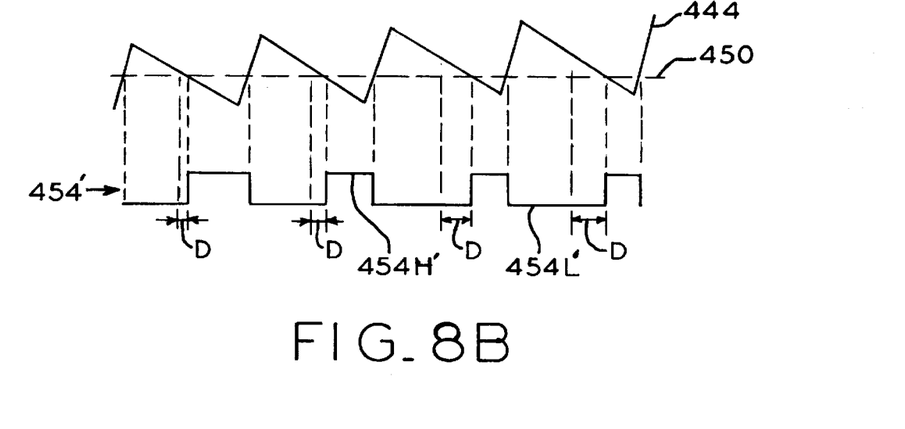

When the actual motor speed is greater than the desired speed, capacitors 434 and 436 will discharge more frequently dumping additional charge and current into the summing junction 432. This additional charge and current will cause the summing junction 432 to be positive. The output of op amp 438 goes high to counterbalance the added current and reduce the discharge rate of the capacitor 430. The result is an unstable, rising sawtooth waveform 444 on line 440 as shown in FIG. 8B. When the discharge of capacitors 434 and 436 is quicker than the speed set resistor can replenish the current, the voltage output of op amp 438 increases because the feedback loop tries to supply more current to the summing junction. Since the rate of discharge of capacitor 430 is constant, the result is an unstable, rising sawtooth.

As will be described below, the unstable, rising sawtooth waveform 444 represents a difference between the actual and desired speed, indicating that the actual speed is greater than the desired speed. This results in a delay of the commutation angle and a reduction of the commutation period.

The commutation circuit also includes a delay circuit 446 providing gate drive signals G1' and G2' to the power switches 410 and 412. The delay circuit 446 delays the closing of the power switches relative to the commutation signals Q, Q' when the determined difference (in the form of unstable sawtooth waveform 444) indicates that the actual rotational speed of the rotating assembly is greater than the desired rotational speed. As a result, the delay maintains a substantially constant rotating speed of the rotating assembly by varying the efficiency of the motor to maintain the substantially constant rotating speed. The delay circuit 446 includes a differential op amp 448 having a negative input receiving the sawtooth waveform of line 440. A positive input of the op 448 receives a reference level voltage 450 (see FIGS. 8A and 8B) generated by a reference voltage generating circuit 452. Op amp 448 provides a pulsed signal 454 (see FIG. 8A) which permits the power switches to be enabled when the pulsed signal is high (454H) and which inhibits the power switches when the pulsed signal is low (454L). The pulsed signal 454 is provided to AND gates 456, 458 for driving each power switch 410, 412. The AND gates also receive a commutation signal such as a signals G1, G2 generated by an application specific integrated circuit (ASIC) or the AND gates may receive a signal corresponding to the commutation signals Q, Q' generated by flip flop 424.

When the signal on line 440 is the stable sawtooth waveform 442, the pulses of the pulsed signal 454 are simultaneously applied to the AND gates 456 and 458 during the period of the commutation signals G1, G2 (or Q, Q'). As a result, each AND gate provides an output during the commutation period so that the power switches are enabled for the time the sawtooth 442 is below the reference 450. As shown in FIG. 8A, steady state commutation begins during the rising edge of the pulse 454H. The power switches are permitted to close when the sawtooth waveform 442 is at or below the reference level 450. FIG. 8B illustrates a situation where the motor speed is higher than desired, such as when a load on the motor is being reduced or withdrawn. In this situation, the unstable waveform 444 does not allow feedback capacitor 430 to fully discharge so that the period of time that the sawtooth waveform 444 is at or below the reference level 450 decreases. The pulsed output 454' from op amp 448 results in shorter periods when the pulsed signal is high (454H') and commutation is permitted; and it results in longer periods when the pulsed signal is low (454L') and commutation is inhibited. FIG. 8B shows that the higher pulses 454H' are delayed by an amount D. This delay causes a reduction in the duty cycle of the power switches and causes a reduced efficiency in the motor. The result is that the motor decelerates until it reaches the desired speed and the commutating circuit retards the commutation angle by amount D when the determined difference indicates that the speed of the rotating assembly is greater than the desired rotating speed. FIGS. 8A and 8B also illustrate that, since the permissive or ON time 454H is greater than ON time 454H', the commutating circuit decreases the ON time period when the determined difference indicates that the speed of the rotating assembly is greater than the desired rotating speed.

Figure 5:
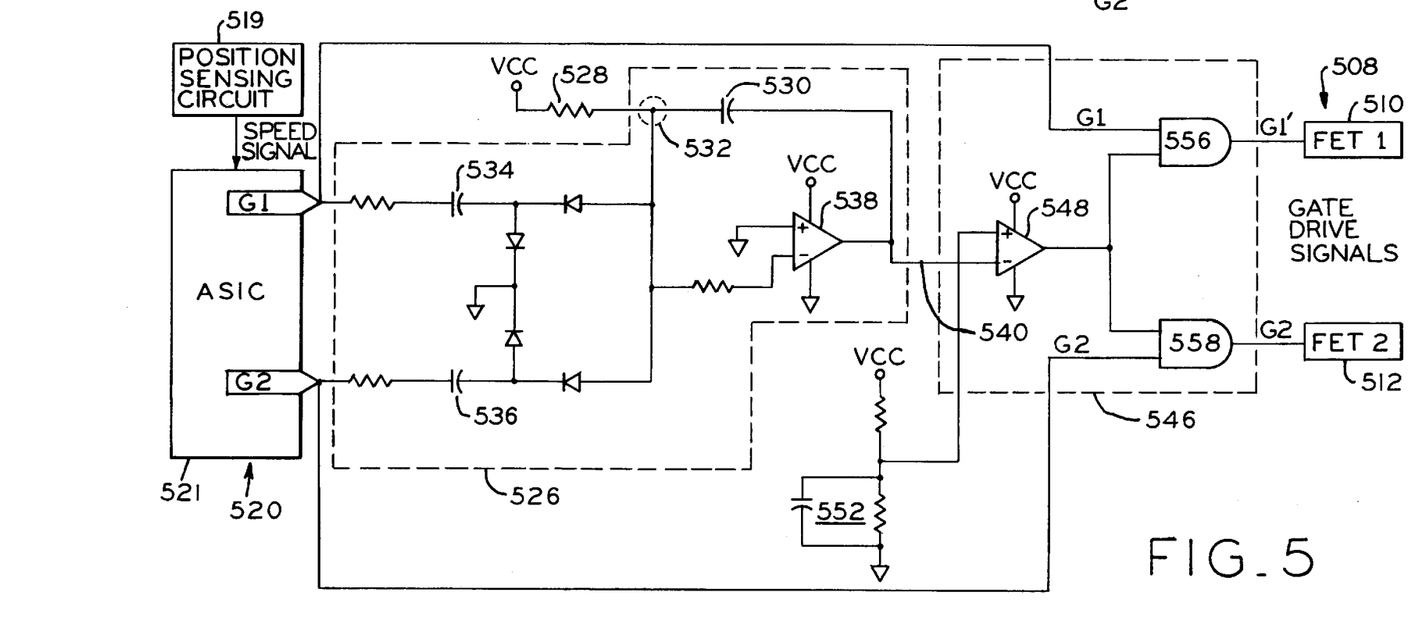
FIG. 5 is a schematic diagram of one preferred embodiment of a constant speed control circuit and motor according to the invention employing an application specific integrated circuit (ASIC) providing a speed signal representing the motor speed, which speed signal is used to maintain constant speed by varying the delay of the commutation start point.
Figure 6A:
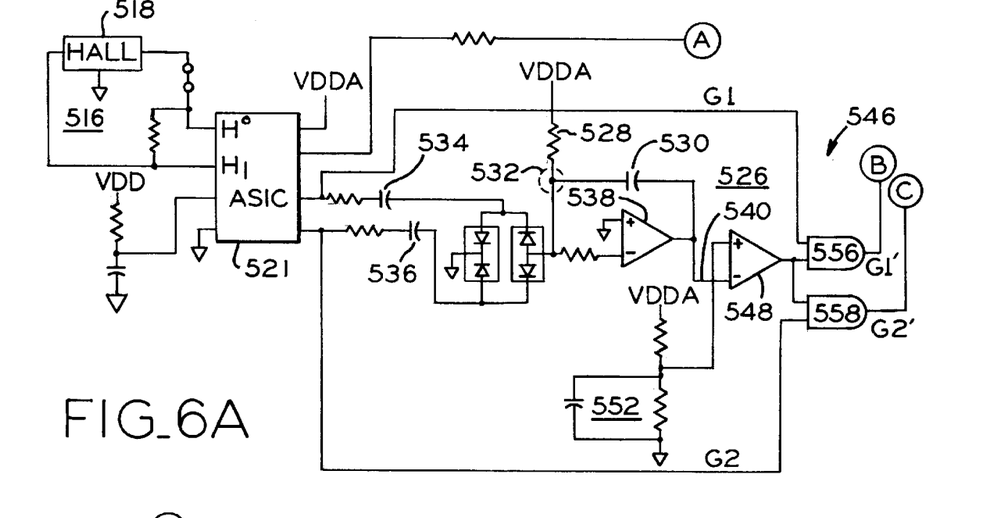
FIGS. 6A, 6B and 6C are a schematic diagram of one preferred embodiment of a constant speed control circuit for a center tapped motor according to the invention employing an application specific integrated circuit (ASIC) providing a speed signal representing the motor speed, which speed signal is used to maintain constant speed by varying the delay of the commutation start point.
Figure 6B:
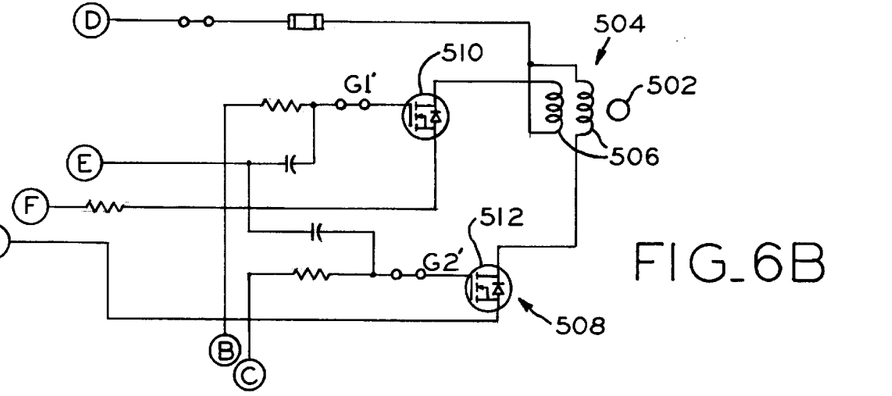
Figure 6C:
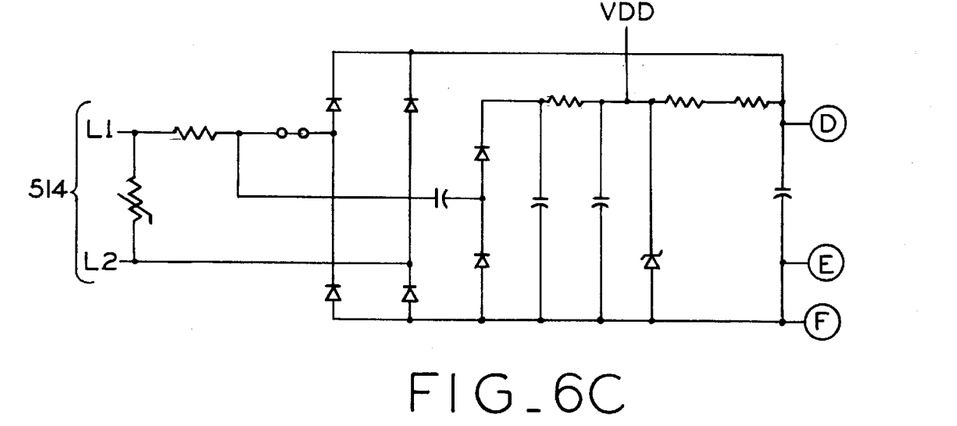
Figure 7A:
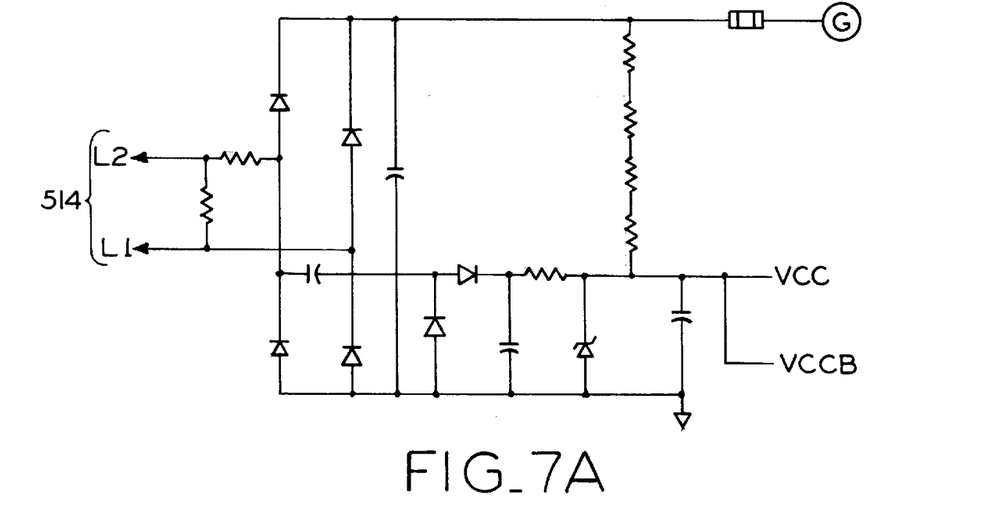
FIGS. 7, 7B, and 7C are is a schematic diagram of one preferred embodiment of a constant speed H-bridge control circuit and single phase motor according to the invention employing an application specific integrated circuit (ASIC) providing a speed signal representing the motor speed, which speed signal is used to maintain constant speed by varying the delay of the commutation start point.
Figure 7B:
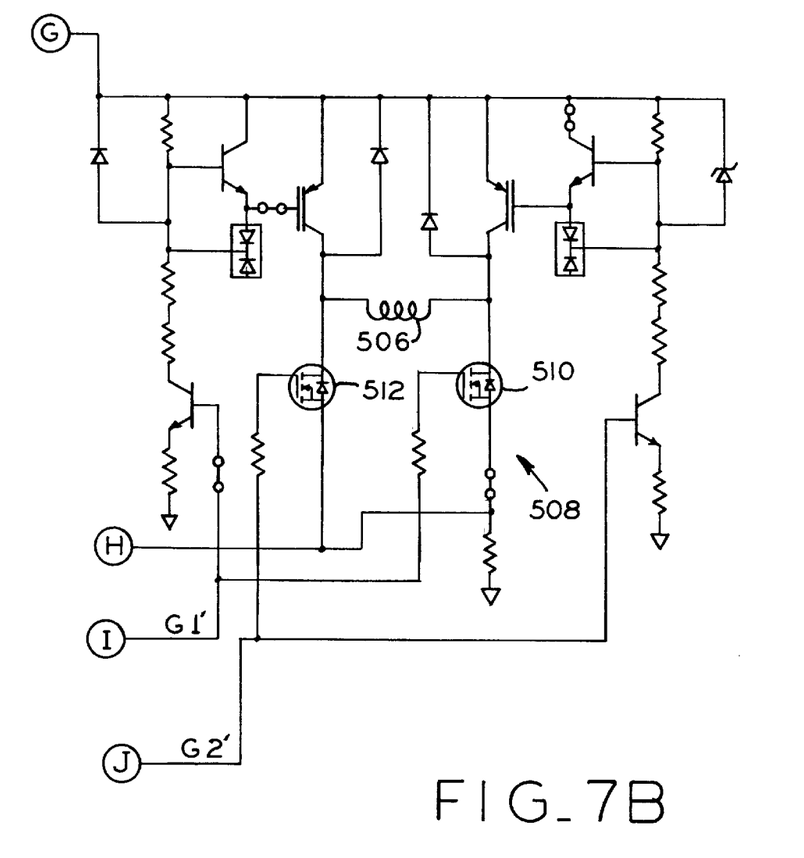

FIGS. 5–7 illustrates other preferred embodiments of the invention and operate in substantially the same manner as FIG. 4. A rotating assembly 502 is in magnetic coupling relation to a stationary assembly 504 which includes a winding 506 having first and second winding portions. As shown in FIG. 6B, the winding 506 is a center tap single phase winding, but it may be any single phase as shown in FIG. 7B or multiple phase winding. A power switching circuit 508 includes power switches 510, 512 such as field effect transistors (FET) adapted to selectively connect power source 514 to each portion of the windings 506, respectively. The power switches receive gate drive signals G1', G2' for selectively energizing the winding to generate a magnetic field which causes the rotating assembly to rotate relative to the stationary assembly.

A circuit 516 generates a speed signal (H+,H°) representative of a rotational speed of the rotatable assembly relative to the stationary assembly. As shown in FIG. 4, the circuit 516 includes a hall sensor 518 or a position sensing circuit 519 for sensing magnets of the permanent magnet rotor 502. The circuit may be any circuit which provides a speed signal such as a back EMF sensing circuit, a rotor position sensing circuit, or other circuit which provides a signal indicative rotor speed or rotor position.

The commutating circuit includes a generating circuit 520 such as ASIC521 responsive to the speed signals (H+,H°) for generating commutation signals G1, G2 corresponding to the speed signals. The commutation signals are used to control the power switches as will be pointed out below.

Preferably, the hall device 518 is positioned to provide the position signal to indicate when the back emf of the winding changes polarity. In this case, the commutating circuit controls the power switches to energize the winding for a preset period of about 135 electrical degrees beginning when the position signal indicates that the back emf changes polarity.

Figure 7C:
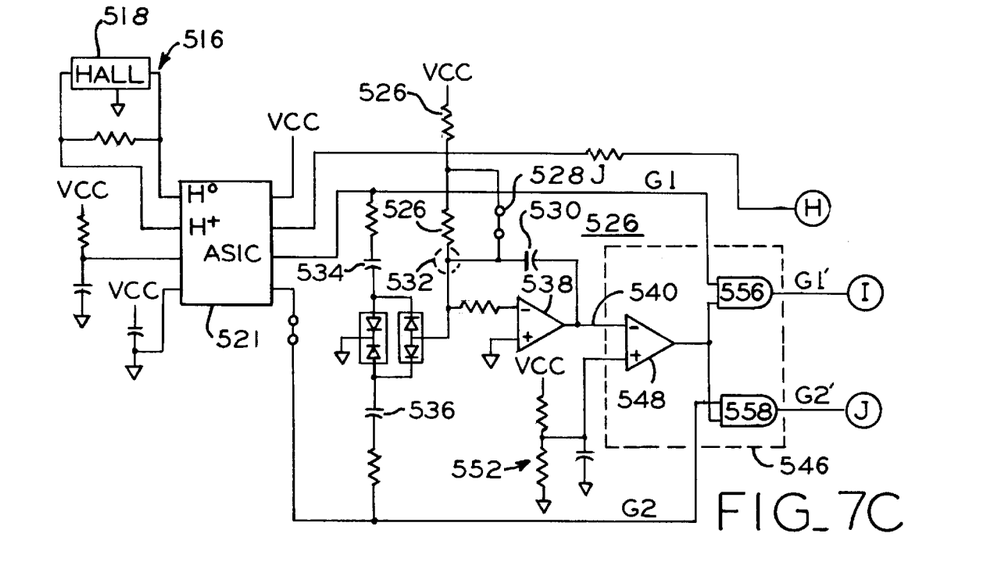

The commutating circuit also includes a comparing circuit 526 for determining a difference between a reference representing a desired rotational speed of the rotating assembly 502 and a repetition rate of the commutation signals G1, G2 which repetition rate corresponds to an actual rotational speed of the rotating assembly. In this comparing circuit 526, the reference is speed set resistor(s) 528 which discharges a feedback capacitor 530 through a summing junction 532 and supplies current into the junction. As shown in FIG. 7C, two speed set resistors are used and a jumper 528J permits the second one to be bypassed. This reference is compared to current draw by two capacitors 534 and 536 in response to commutation. With each commutation, one of the commutation signals G1 or G2 is high and the other is low. When signal G1 is low, it discharges its capacitor 534 by drawing current from the summing junction 532. When signal G2 is low, it discharges its capacitor 536 by drawing current from the summing junction 532. Therefore, the amount of current drawn from the summing junction by capacitors 534 and 536 represents the actual speed of the motor. In addition, the amount of current supplied to the summing junction by discharging of the feedback capacitor 530 through speed set resistor 528 represents the desired speed of the motor. When the currents to or from the summary junction 532 are equal, a steady state condition results which is an indication that the actual motor speed equals the desired speed. Smaller resistance values of the speed set resistor 528 result in more current flowing into the summing junction 532 meaning a higher speed is desired and the capacitors 534 and 536 have to discharge more frequently before an unstable waveform indicating an overspeed condition is generated.

The summing junction 532 is connected to a difference input of a differential operational amplifier 538 which has its sum input grounded so that its output is high. As long as the net current at the summing junction 532 is zero (i.e., steady state) or negative (meaning the actual speed is less than the desired speed), the waveform on line 540 is a stable sawtooth waveform 442 as shown in FIG. 8A. The sawtooth configuration is caused by the discharging of feedback capacitor 530. As the speed set resistor 528 provides current to the summing junction, the op amp 538 slowly reduces its output voltage to counterbalance current flow through the speed set resistor. As will be described below, a stable sawtooth waveform 442 represents no difference between the actual and desired speed.

An optional feedback resistor may be placed in series with the feedback capacitor 530 to protect the op amp 538 from spikes. The remaining components of the comparing circuit 526, e.g. the diodes, permit the circuit to behave more predictably but do not affect currents into or out of the summing junction 532 and, thus, do not affect the speed control of the motor.

When the actual motor speed is greater than the desired speed, capacitors 534 and 536 will discharge more frequently dumping additional charge and current into the summing junction 532. This additional charge and current will cause the summing junction 532 to be positive. The output of op amp 538 goes high to counterbalance the added current and reduce the discharge rate of the capacitor 530. The result is an unstable, rising sawtooth waveform 444 on line 540 as shown in FIG. 8B. When the discharge of capacitors 534 and 536 is quicker than the speed set resistor can replenish the current, the voltage output of op amp 538 increases because the feedback loop tries to supply more current to the summing junction. Since the rate of discharge of capacitor 530 is constant, the result is an unstable, rising sawtooth.

As will be described below, the unstable, rising sawtooth waveform 444 represents a difference between the actual and desired speed, indicating that the actual speed is greater than the desired speed. This results in a delay of the commutation angle and a reduction of the commutation period.

The commutation circuit also includes a delay circuit 546 providing gate drive signals G1' and G2' to the power switches 510 and 512. The delay circuit 546 delays the closing of the power switches relative to the commutation signals Q, Q' when the determined difference (in the form of unstable sawtooth waveform 444) indicates that the actual rotational speed of the rotating assembly is greater than the desired rotational speed. As a result, the delay maintains a substantially constant rotating speed of the rotating assembly by varying the efficiency of the motor to maintain the substantially constant rotating speed. The delay circuit 546 includes a differential op amp 548 having a negative input receiving the sawtooth waveform of line 540. A positive input of the op 548 receives a reference level voltage 450 (see FIGS. 8A and 8B) generated by a reference voltage generating circuit 552. Op amp 548 provides a pulsed signal 454 (see FIG. 8A) which permits the power switches to be enabled when the pulsed signal is high (454H) and which inhibits the power switches when the pulsed signal is low (454L). The pulsed signal 554 is provided to AND gates 556, 558 for driving each power switch 510, 512. The AND gates also receive the commutation signals G1, G2 generated by an application specific integrated circuit (ASIC) or the AND gates may receive a signal corresponding to the commutation signals.

When the signal on line 440 is the stable sawtooth waveform 442, the pulses of the pulsed signal 454 are simultaneously applied to the AND gates 556 and 558 during the period of the commutation signals G1, G2. As a result, each AND gate provides an output during the commutation period so that the power switches are enabled for the time the sawtooth 442 is below the reference 450. As shown in FIG. 8A, steady state commutation begins during the rising edge of the pulse 454H. The power switches are permitted to close when the sawtooth waveform 442 is at or below the reference level 450. FIG. 8B illustrates a situation where the motor speed is higher than desired, such as when a load on the motor is being reduced or withdrawn. In this situation, the unstable waveform 444 does not allow feedback capacitor 530 to fully discharge so that the period of time that the sawtooth waveform 444 is at or below the reference level 550 decreases. The pulsed output 454' from op amp 548 results in shorter periods when the pulsed signal is high (454H') and commutation is permitted; and it results in longer periods when the pulsed signal is low (454L') and commutation is inhibited. FIG. 8B shows that the higher pulses 454H' are delayed by an amount D. This delay causes a reduction in the duty cycle of the power switches and causes a reduced efficiency in the motor. The result is that the motor decelerates until it reaches the desired speed and the commutating circuit retards the commutation angle by amount D when the determined difference indicates that the speed of the rotating assembly is greater than the desired rotating speed. FIGS. 8A and 8B also illustrate that, since the permissive or ON time 454H is greater than ON time 454H', the commutating circuit decreases the ON time period when the determined difference indicates that the speed of the rotating assembly is greater than the desired rotating speed.

It is also contemplated that in one preferred embodiment of the invention a constant speed microprocessor based circuit may be used to compare the speed signal repetition rate to a reference. For example, the microprocessor would replace circuits 520, 526 and 546 of FIG. 4 and receive the speed signals generated by the hall device 518. The microprocessor would use the speed signal repetition rate to calculate the actual speed of the motor and compare it to a reference speed stored in memory or defined by a signal provided to the microprocessor. The microprocessor would provide an output signal which would be provided to an AND gate or other logic to control the power switches. By delaying the output signal relative to the gate signal, the microprocessor would delay the commutation start point. Using additional logic circuitry or an algorithm, the microprocessor could also advance the commutation angle or extend or shorten the commutation period of the power switches. However, adjusting the end of the commutation period rather than the beginning generally has less effect on the speed of the motor. Also, the microprocessor could pulse width modulate the power switches to provided added control, although it is generally contemplated that the simple nature of these circuits would not require pulse width modulation.

In summary, the microprocessor would constitute a commutating circuit responsive to the speed signal and including a generating circuit for generating commutation signals corresponding to the speed signal. The microprocessor would provide gate drive signals for commutating the power switches at a commutating angle for a period of ON time. The microprocessor would determine a difference between a reference representing a desired rotational speed of the rotating assembly and a repetition rate of the commutation signals, which repetition rate corresponds to an actual rotational speed of the rotating assembly. The microprocessor would vary the commutating angle and/or vary a length of the period of ON time in response to the determined difference to maintain a substantially constant rotating speed of the rotating assembly whereby the efficiency of the motor is varied to maintain the substantially constant rotating speed.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A motor for use with a substantially constant power source comprising:

a rotating assembly;

a stationary assembly in magnetic coupling relation to the rotating assembly and including a winding;

a power switching circuit including power switches adapted to selectively connect the power source to the winding during a commutation period, said power switches for receiving gate drive signals for selectively energizing the winding to generate a magnetic field which causes the rotating assembly to rotate relative to the stationary assembly;

a circuit generating a speed signal representative of a rotational speed of the rotatable assembly relative to the stationary assembly; and a commutating circuit responsive to the speed signal and including a generating circuit for generating commutation signals corresponding to the speed signal, the commutation signals for controlling the power switches, said commutating circuit providing the gate drive signals for commutating the power switches at a commutating angle for a commutation period, said commutating circuit determining a difference between a reference representing a desired rotational speed of the rotating assembly and a repetition rate of the commutation signals, which repetition rate corresponds to an actual rotational speed of the rotating assembly, said commutating circuit retarding the commutating angle of the commutation period and/or decreasing a length of the commutation period by delaying a start of ON time of the gate drive signals when the determined difference indicates that the actual speed of the rotating assembly is greater than the desired rotating speed to maintain a substantially constant rotating speed of the rotating assembly whereby the efficiency of the motor is reduced to maintain the substantially constant rotating speed.

2. The motor of claim 1 wherein the commutating circuit advances the commutation angle of the gate drive signals when the determined difference indicates that the speed of the rotating assembly is less than the desired rotating speed.

3. The motor of claim 2 wherein the commutating circuit increases the length of the commutation period when the determined difference indicates that the speed of the rotating assembly is less than the desired rotating speed.

4. The motor of claim 1 wherein the commutating circuit increases the length of the commutation period when the determined difference indicates that the speed of the rotating assembly is less than the desired rotating speed.

5. The motor of claim 1 wherein the circuit generating a speed signal comprises a position sensing circuit providing a signal indicative of the position of the rotating assembly.

6. The motor of claim 5 wherein the position sensing circuit includes a hall device positioned to provide a signal to indicate when the back emf of the winding changes polarity and wherein the commutating circuit controls the power switch to energize the winding for a preset period beginning when the signal indicates that the back emf changes polarity.

7. The motor of claim 1 wherein the winding comprises a center tapped single phase winding having first and second windings, wherein the power switches include first and second power switches, the first power switch selectively energizing the first winding and the second power switch selectively energizing the second winding.

8. The motor of claim 1 wherein the winding comprises a single phase winding and wherein the power switches include an H-bridge of four power switches for selectively energizing the single phase winding.

9. The motor of claim 1 wherein the commutating circuit generates first and second commutating signals and wherein the commutating circuit includes first and second capacitors selectively discharged by the first and second commutating signals, the amount of charge being discharged being representative of the actual speed of the motor.

10. The motor of claim 1 wherein the commutating circuit includes an application specific integrated circuit (ASIC) for generating the commutation signals.

11. A motor control circuit for use with a power source, a rotating assembly, and a stationary assembly in magnetic coupling relation to the rotating assembly and including a winding, said control comprising:

a power switching circuit including power switches adapted to selectively connect the power source to the winding during a commutation period, said power switches for receiving gate drive signals for selectively energizing the winding to generate a magnetic field which causes the rotating assembly to rotate relative to the stationary assembly;

a circuit generating a speed signal representative of a rotational speed of the rotatable assembly relative to the stationary assembly; and a commutating circuit responsive to the speed signal and including a generating circuit for generating commutation signals corresponding to the speed signal, the commutation signals for controlling the power switches, said commutating circuit providing the gate drive signals for commutating the power switches at a commutating angle for a commutation period, said commutating circuit determining a difference between a reference representing a desired rotational speed of the rotating assembly and a repetition rate of the commutation signals, which repetition rate corresponds to an actual rotational speed of the rotating assembly, said commutating circuit retarding the commutating angle of the commutation period and/or decreasing a length of the commutation period by delaying a start of ON time of the gate drive signals when the determined difference indicates that the actual speed of the rotating assembly is greater than the desired rotating speed to maintain a substantially constant rotating speed of the rotating assembly whereby the efficiency of the motor is reduced to maintain the substantially constant rotating speed.

12. A motor for use with a substantially constant power source comprising:

a rotating assembly;

a stationary assembly in magnetic coupling relation to the rotating assembly and including a winding;

a power switching circuit including power switches adapted to selectively connect the power source to the winding during a commutation period, said power switches for receiving gate drive signals for selectively energizing the winding to generate a magnetic field which causes the rotating assembly to rotate relative to the stationary assembly;

a circuit generating a speed signal representative of a rotational speed of the rotatable assembly relative to the stationary assembly; and a commutating circuit including:
- a generating circuit responsive to the speed signal for generating commutation signals corresponding to the speed signal, said commutation signals for controlling the power switches;
- a comparing circuit for determining a difference between a reference representing a desired rotational speed of the rotating assembly and a repetition rate of the commutation signals, which repetition rate corresponds to an actual rotational speed of the rotating assembly; and
- a delay circuit providing the gate drive signals to the power switches, said delay circuit delaying the switching of the power devices by the gate drive signals relative to the commutation signals when the determined difference indicates that the actual rotational speed of the rotating assembly is greater than the desired rotational speed to maintain a substantially constant rotating speed of the rotating assembly whereby the efficiency of the motor is reduced to maintain the substantially constant rotating speed.

13. The motor of claim 12 wherein the circuit generating a speed signal comprises a position sensing circuit providing a signal indicative of the position of the rotating assembly.

14. The motor of claim 13 wherein the position sensing circuit includes a hall device positioned to provide the position signal to indicate when a back emf of the winding becomes positive and wherein the commutating circuit controls the power switch to energize the winding for a preset period beginning when the position signal indicates that the back emf becomes positive.

15. The motor of claim 12 wherein the winding comprises a center tapped single phase winding having first and second windings, wherein the power switches include first and second power switches, the first power switch selectively energizing the first winding and the second power switch selectively energizing the second winding.

16. The motor of claim 12 wherein the winding comprises a single phase winding and wherein the power switches include an H-bridge of four power switches for selectively energizing the single phase winding.

17. The motor of claim 12 wherein the generating circuit generates first and second commutating signals and wherein the comparing circuit includes first and second capacitors selectively discharged into a summing junction by the first and second commutating signals, the amount of charge being discharged into the summing junction being representative of the actual speed of the motor.

18. The motor of claim 12 wherein the generating circuit includes an application specific integrated circuit (ASIC) for generating the commutation signals.

* * * * *